(No Model.)
W. A. CROWDUS.
PRIMARY BATTERY.
No. 555,304. Patented Feb. 25, 1896.
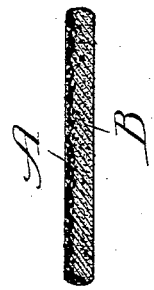
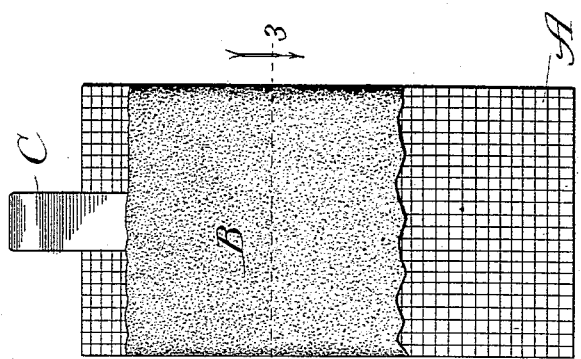
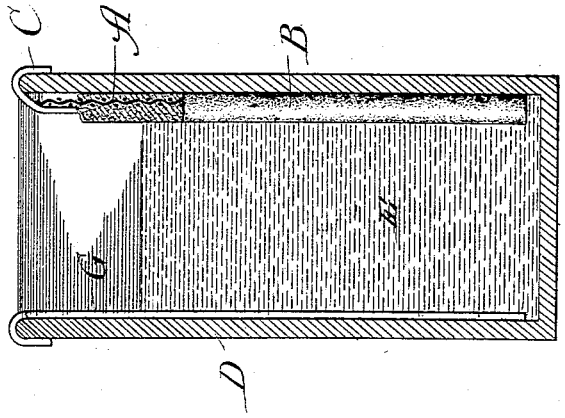
Witnesses:
Chas. E. Gaylord,
Lute J. Alter.
Inventor:
Walter A. Crowdus,
By Banning & Banning & Sheridan,
Attys.

UNITED STATES PATENT OFFICE.

WALTER A. CROWDUS, OF CHICAGO, ILLINOIS.

PRIMARY BATTERY.

SPECIFICATION forming part of Letters Patent No. 555,304, dated February 25, 1896.

Application filed October 4, 1895. Serial No. 564,622. (No model.)

*To all whom it may concern:*

Be it known that I, WALTER A. CROWDUS, a citizen of the United States, residing at Chicago, Cook county, Illinois, have invented certain new and useful Improvements in Primary Batteries, of which the following is a specification.

My invention relates particularly to that class of primary batteries known as "single-fluid cells," in which the positive and negative elements are introduced in a cell containing one liquid, as contradistinguished from those having two fluids separated by a porous partition; and my invention relates particularly to a negative electrode or element of such single-fluid primary batteries.

The object of my invention is to provide a simple, economical, and efficient negative electrode fit for commercial use; and the invention consists in the features, combinations, and details of construction hereinafter described and claimed.

This invention has to do with the oxides of metals—such as oxide of copper—which possesses the property of being reduced to the basic metal by electric and chemical actions when introduced in proper form into primary battery-cells.

Heretofore primary batteries using metallic oxides have been inefficient owing to the fact that the oxide of such metals was in itself a non-conductor of electricity. My invention is intended to remove these objections by providing a negative electrode in which the oxide is in contact with a supporting conducting-plate which reduces the internal resistance, or the resistance of the element, to the lowest possible point.

In the accompanying drawings, Figure 1 is a vertical sectional elevation of a battery, showing my improved negative electrode in a single-fluid cell; Fig. 2, a front elevation of my improved electrode partly in section; and Fig. 3 a transverse section of the electrode, taken on line 3 of Fig. 2.

In constructing my improved electrode I use, preferably, a plate A of reticulated metal, on which I place a layer of oxide of copper or its equivalent previously prepared and mixed with a suitable proportion of resinous oil, so as to form a coherent paste. This paste is preferably applied to the metallic conducting-plate by mechanical means, such as by the use of a spatula. After the plate has been provided with its layer of oxide it is placed in the furnace and heated until the oxide is fused into one solid mass, when it is withdrawn, allowed to cool, and is ready for use. A terminal C may be supplied to the supporting-plate by soldering or any other desired means.

In using my improved electrode it is placed in a battery-cell D containing a solution of caustic potash E and a zinc positive electrode G, so that by connecting the electrodes by wire electric energy is formed and may be used as desired.

I claim—

1. A negative element for primary batteries consisting of a reticulated supporting conducting-plate provided with a porous coating of baked copper oxide and a carbonized binder, substantially as described.

2. A negative element for primary batteries consisting of a wire-mesh supporting conducting-plate provided with a porous coating of baked copper oxide and a binder of resinous oil, substantially as described.

WALTER A. CROWDUS.

Witnesses:
THOMAS F. SHERIDAN,
THOMAS B. MCGREGOR.